US005884957A

United States Patent [19]

Shoen et al.

[11] Patent Number: 5,884,957

[45] **Date of Patent: *Mar. 23, 1999**

[54] MOVING VEHICLE EQUIPPED WITH VENDING DEVICE

[75] Inventors: Edward J. Shoen, Phoenix; Bruce L. Royer, Cave Creek, both of Ariz.

[73] Assignee: U-Haul International, Inc., Tempe, Ariz.

[ * ] Notice: This patent issued on a continued prosecution application filed under 37 CFR 1.53(d), and is subject to the twenty year patent term provisions of 35 U.S.C. 154(a)(2).

[21] Appl. No.: 696,722

[22] Filed: Aug. 14, 1996

[51] Int. Cl.[6] .......... B60N 3/00

[52] U.S. Cl. .......... 296/37.1; 296/37.5; 296/37.6

[58] Field of Search .......... 296/37.1, 37.5, 296/37.6; 280/47.34

[56] References Cited

U.S. PATENT DOCUMENTS

| | | | |
|---|---|---|---|
| 487,008 | 11/1892 | Smith | 194/295 |
| 750,741 | 1/1904 | Wertz | 194/294 |
| 856,019 | 6/1907 | Bigelow | 194/267 |
| 1,191,032 | 7/1916 | Pierre | 194/295 |
| 1,241,844 | 10/1917 | Gottschall | 296/37.5 |
| 1,585,179 | 5/1926 | Whipple | 221/260 |
| 2,733,094 | 1/1956 | Carlton | 296/22 |
| 2,852,159 | 9/1958 | Klein | 221/194 |
| 2,853,083 | 9/1958 | Roedelheimer, et al. | 453/39 |
| 3,572,795 | 3/1971 | Howard et al. | 292/251 |
| 3,807,788 | 4/1974 | Radek | 296/1.1 |
| 3,857,579 | 12/1974 | Hoodenpyle | 280/47.2 |
| 4,088,365 | 5/1978 | Johnson | 296/37.6 |
| 4,844,528 | 7/1989 | Johnson | 296/37.1 |
| 4,889,377 | 12/1989 | Hughes | 296/3 |
| 4,957,228 | 9/1990 | Balka | 224/505 |
| 5,088,636 | 2/1992 | Barajas | 224/281 |
| 5,186,510 | 2/1993 | Stapp | 296/37.5 |
| 5,472,074 | 12/1995 | Milcetic | 194/342 |
| 5,505,358 | 4/1996 | Haase | 224/539 |

*Primary Examiner*—Andrew C. Pike
*Attorney, Agent, or Firm*—Jeffer, Mangels, Butler & Marmaro LLP

[57] ABSTRACT

A moving system includes a moving vehicle, a vending device, and moving supplies. The vending device is affixed to the moving vehicle, defines an enclosed volume, and includes a sealing device affixed to the vending device for sealing the enclosed volume of the vending device. The moving supplies are disposed within the enclosed volume of the vending device and are available to be dispensed.

24 Claims, 9 Drawing Sheets

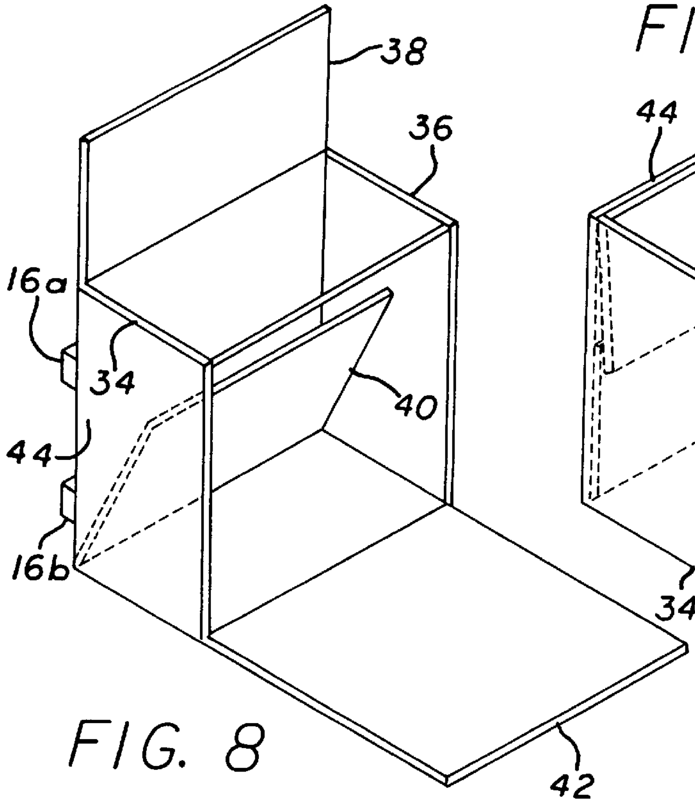
FIG. 8
FIG. 9
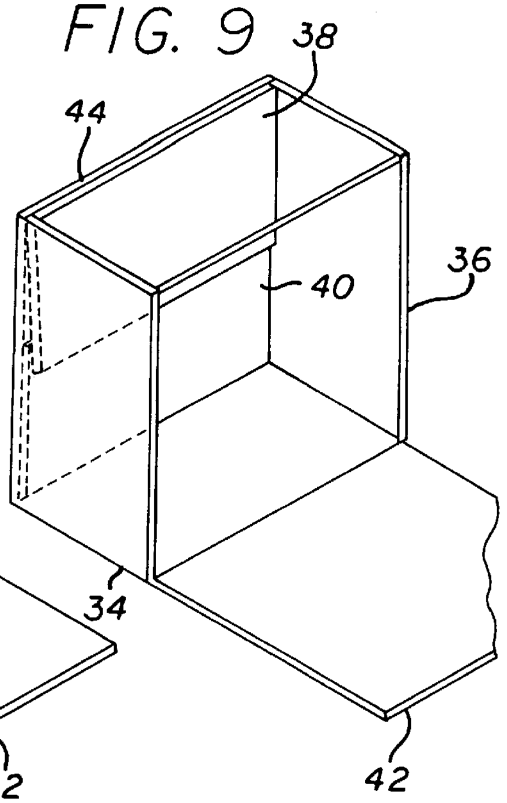
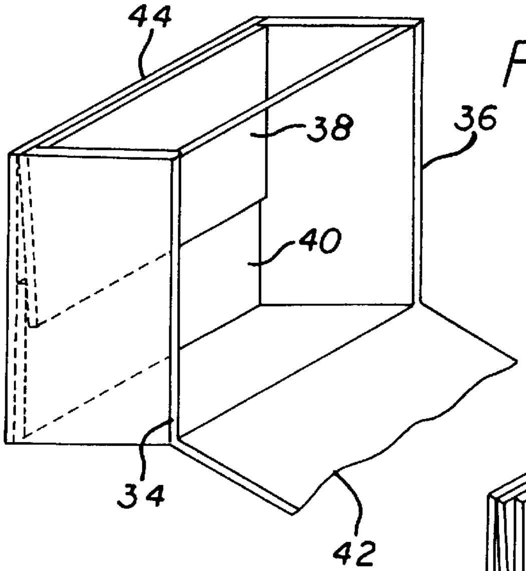
FIG. 10
FIG. 11
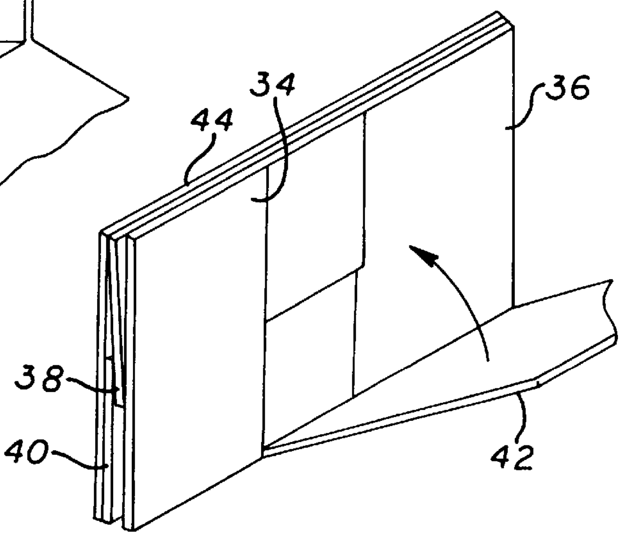

MOVING VEHICLE EQUIPPED WITH VENDING DEVICE

FIELD OF THE INVENTION

The present invention relates to a combined vehicle vending system comprising a vending device affixed adjacent a vehicle, vending devices, and methods for utilizing same, preferably suited for the do-it-yourself moving industry.

BACKGROUND OF THE INVENTION

The use and rental of accessories which are related to home or business moving, for example, furniture pads, wheeled dollies, and the like, are known in the art. Generally, these items can be rented from, for example, a moving supply and moving truck rental company. An example of such a do-it-yourself moving rental company is the world famous U-Haul International, Inc., which annually provides moving vehicles and supplies to a very large number of consumers of such products and services.

In order to control the rental process, these items are typically kept on the premises of the rental company and are rented separately from a moving truck or trailer. The supplies must then be loaded on the moving vehicle or otherwise be transported to the place they will be used. The on-premise supplies also take up space which might be used to store other items. If these supplies were merely left on a moving vehicle, monitoring the use of these items to determine which moving vehicle users should be charged a rental fee would be difficult. Further, storage of these items on the floor of the moving vehicle, especially if not used, would diminish the most useful space available for cargo.

It would be useful to have a device, system, and methods which would allow, for example, moving supplies to be conveniently and safely stored "adjacent" the moving vehicle, for example, within the utility box of the moving vehicle. Additionally, it would be useful to provide a method for monitoring the usage of such supplies so that those who make use of the supplies can be charged an optional rental fee. It would also be useful to have an integrated system for providing equipment and supplies to a moving vehicle user by providing such supplies on the moving vehicle.

SUMMARY OF THE INVENTION

According to one aspect of the present invention there is provided a moving vehicle including a moving vehicle and a vending device affixed adjacent the moving vehicle. The vending device preferably contains moving supplies available to be dispensed. The inventive combination of a moving vehicle and a vending device affords the user thereof ready access to moving supplies as they are needed.

In a preferred embodiment, the vending device affixed adjacent the moving vehicle further includes an access-detectable or access-controllable seal.

According to another aspect of the present invention there is provided a vending system for use with a moving vehicle including at least one vending device affixed adjacent a moving vehicle. The vending device contains moving supplies available to be dispensed.

In a preferred embodiment, the vending device affixed adjacent the moving vehicle further includes an access-detectable or access-controllable seal.

In a preferred embodiment, the vending device is formed from a plurality of separate enclosing members. In a more preferred embodiment, the separate enclosing members include a first side member, a second side member, a top member, a bottom member, a back member, and a front member. The separate enclosing members are abutted so as to form an enclosed volume of space. In a most preferred embodiment, the separate enclosing members are rigid.

According to still another aspect of the present invention there is provided a vending device including an implement-for-moving engaging latch for affixing an implement useful in moving.

In a preferred embodiment the implement useful in moving is a moving dolly. The access to the dolly can be controlled concurrently with or independently of access to the vending device.

According to yet another aspect of the present invention there is provided a vending device for use adjacent a moving vehicle, including a collapsible vending device affixed adjacent the moving vehicle. The vending device is comprised of a plurality of separate enclosing members in movable engagement, whereby a volume of space enclosed by the collapsible vending device can be reversibly reduced. The vending device may further include an access-detectable seal; the access-detectable seal allows for detection of access to an interior of the vending device.

According to another aspect of the present invention, there is provided a method for vending supplies from a moving vehicle including the step of accessing moving supplies from a vending device affixed adjacent a moving vehicle.

According to another aspect of the present invention, there is provided a method for providing supplies to the users of a moving vehicle and of controlling the accessing of such supplies. The method includes the steps of providing a vending device affixed adjacent a moving vehicle; providing supplies within the vending device; securing the supplies within the vending device with an access-detectable seal; providing the moving vehicle to a user; and detecting the access or nonaccess of the vending device.

According to another aspect of the present invention, there is provided a method for providing supplies to the users of a moving vehicle and of controlling the accessing of such supplies. The method includes the steps of providing supplies within a vending device; securing the supplies within the vending device with an access-controlling means, wherein the vending device is affixed adjacent the moving vehicle; providing the moving vehicle to a user; and controlling the access or nonaccess to the vending device.

Other objects, features, and advantages of the present invention will become apparent to those skilled in the art from the following detailed description and taken in conjunction with the accompanying drawings which illustrate, by way of example, various features of preferred embodiments of the present invention. It is to be understood, however, that the detailed description and specific examples, while indicating preferred embodiments of the present invention, are given by way of illustration and not limitation. Many changes and modifications within the scope of the present invention can be made without departing from the spirit thereof, and the invention includes all such modifications.

DESCRIPTION OF THE FIGURES

The detailed description of the invention will be made with reference to the accompanying drawings, where like numerals designate corresponding parts of the figures. The drawings are meant to be generally illustrative of various examples of the present invention, but are merely examples and are not meant to be limiting of the scope of the invention.

FIGS. 8–11 are perspective outline views of a folding sequence of one embodiment of a vending device of the present invention.

DETAILED DESCRIPTION OF THE PREFERRED EMBODIMENTS

Figure 1:
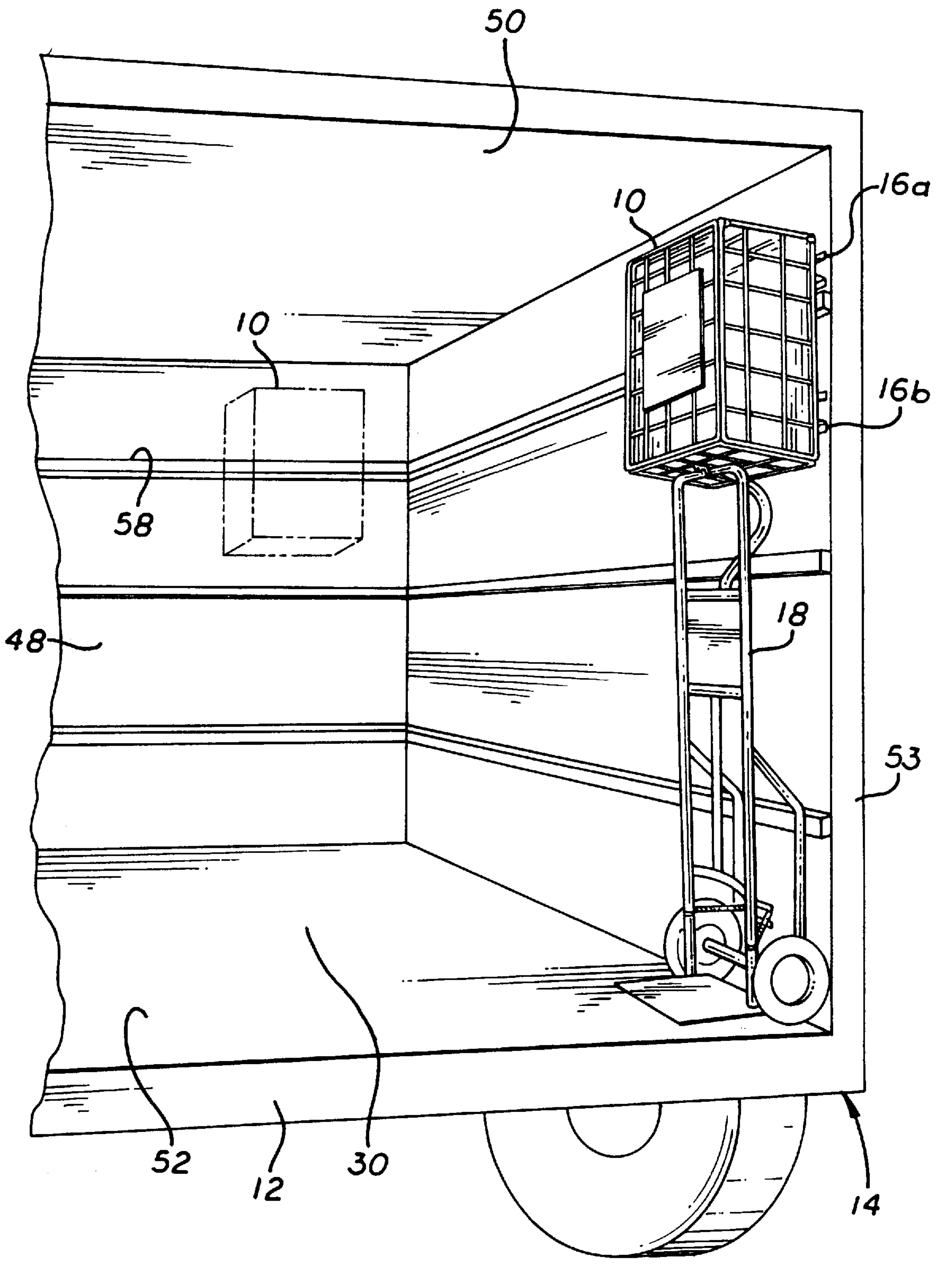
FIG. 1 is a perspective view of one embodiment of a vending system of the present invention, showing a vending device affixed to a moving vehicle, with an optional second vending device 10 shown in phantom.

Referring now to the drawings, in FIG. 1 vending device 10 is mounted on a sidewall of utility box 12 of moving vehicle 14, by mounting brackets 16*a–b*. Moving dolly 18 is positioned under vending device 10, both of which are disposed in cargo compartment 30 of moving vehicle 14.

As used herein, a "moving vehicle" denotes a self-propelled or towed vehicle the primary function of which is to transport home and/or business furnishings and items commonly kept in homes and/or businesses. Such vehicles comprise at least one compartment for storing and transporting home and/or business furnishings. "Moving vehicles" thus include moving vans, trailers, and the like, but do not include vehicles whose primary purpose is to carry passengers, e.g., personal automobiles, taxis, buses, etc.

Utility box 12 delimits cargo compartment 30 of moving vehicle 14, which can be particularly a moving truck or moving trailer. In preferred embodiments the moving vehicle is a do-it-yourself moving vehicle of the type supplied, for example, by U-Haul International, Inc. The moving vehicle can include a ramp which is storable under the utility box of the moving vehicle.

Most generally a vending device is any container or dispenser suitable for securely holding items and allowing access to those items. The vending device 10 can be formed of various materials or configured in various shapes depending upon the materials it is to contain or hold, as would be known to one of ordinary skill in the art. Supplies or equipment can be contained on and/or within the vending device 10. The vending device 10 can have more than one compartment. More than one vending device 10 of the same or a different type can be affixed adjacent moving vehicle 14. The term "vending" does not necessarily denote that a payment is required for access to supplies contained on or in the vending device 10.

Vending device 10 is affixed adjacent a moving vehicle 14 such that it is in contact with moving vehicle 14, and such that vending device 10 moves with moving vehicle 14. However, vending device 10 can be located anywhere in or on moving vehicle 14, for example, including without limitation, on or in the cab of moving vehicle 14, on or in utility box 12 of moving vehicle 14, under utility box 12 of moving vehicle 14, on the roof of utility box 12 of moving vehicle 14, or on the roof of the cab of moving vehicle 14.

Figure 4:
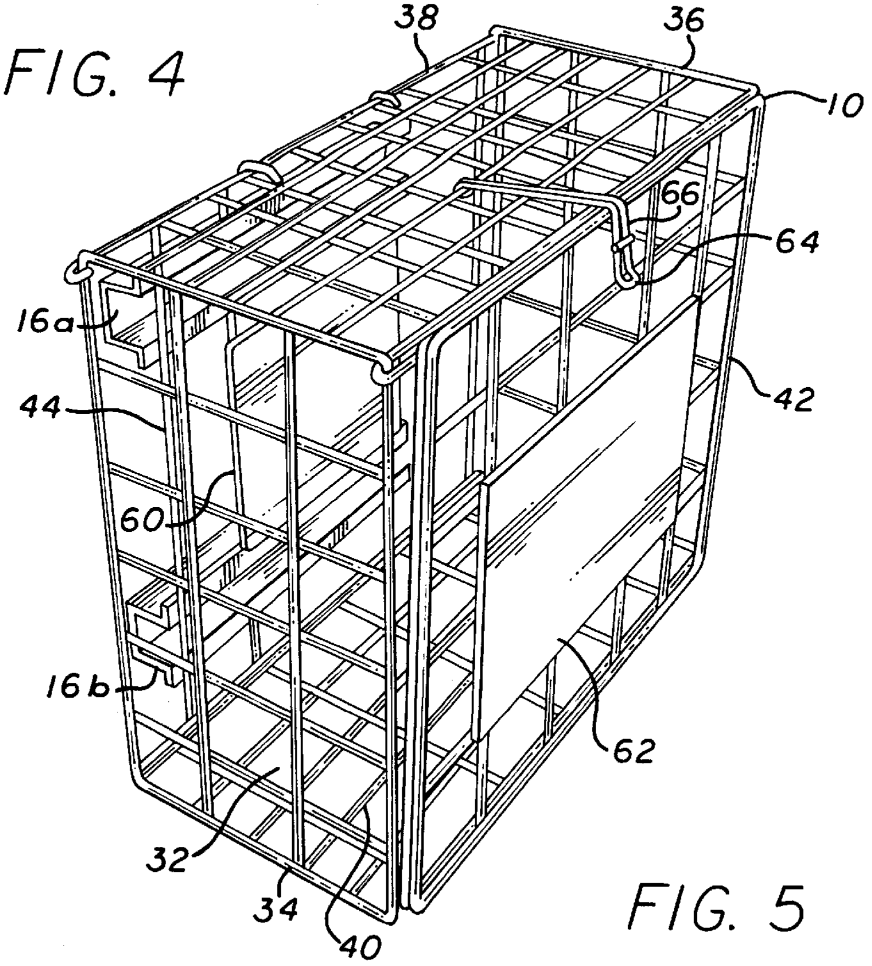
FIG. 4 is a perspective view of one embodiment of a vending device of the present invention.

The vending device 10 includes an enclosed volume of space 32 defined by one or more enclosing members, for example, first side member 34 and second side member 36, as depicted in FIG. 4. The enclosing members define a volume of space of any three-dimensional configuration, including, without limitation, a tetrahedron, a pyramid, a cube, a rectangular prism, a polygonal prism, a prism with curvilinear cross section, a cylinder, a sphere, or any combination thereof. The size of vending device 10 can vary from just sufficient to hold one of the smallest items typically vended, for example, a roll of packing tape, to large enough to occupy substantially all of utility box 12 of moving vehicle 14 so long as space remains available to load not less than one item of cargo.

The enclosing members comprising vending device 10 can be formed from rigid materials, including, without limitation, metal, wood, fiberglass, hard plastics, composite materials, or any combination thereof. The enclosing members can be formed from a flexible material, including, without limitation, fabrics, rubber, soft plastics, leather, weaves of flexible metal cables or ropes, or straps or any combination thereof. The enclosing members can be a combination of rigid and flexible materials.

The separate enclosing members can comprise one or more access members, for example, first side member 34, second side member 36, top member 38, bottom member 40, and front member 42, and one or more nonaccess members, for example rear member 44. Access members can be rotated, removed, contracted, displaced, or otherwise moved or spatially reconfigured to allow access to the interior of vending device 10. Nonaccess members, as designed, and if not tampered with, do not move or otherwise allow access to the interior of vending device 10, except that in some embodiments nonaccess members can also be movable to allow for a minimization of the volume of space occupied in the cargo compartment 30 by vending device 10, as illustrated in FIGS. 8–11 and FIGS. 12–16.

In a preferred embodiment the rigid enclosing members can be formed of an array of rods, as depicted in FIG. 4.

Most preferably the rods are metallic. The array of metal rods can form a lattice whereby a first plurality of rods lying substantially parallel to each other are contacted by a second plurality of substantially parallel rods, the second plurality of rods lying substantially perpendicular to the first plurality of rods, as depicted in FIG. 4. In alternative embodiments the relationship of the rods within the first and second plurality of rods can vary from parallel such that the angle formed between rods within each plurality of rods can vary from 0 degrees to 90 degrees. Further, the relationship of the first plurality of rods to the second plurality of rods can vary from perpendicular such that the angle formed between rods of the first and second plurality of rods can vary from 0 degrees to 90 degrees. In some embodiments, a single rod will not form a straight line, but rather define a curve or a number of curves. A single rod may be of varying diameter, the smallest diameter being that which, at a given spacing between rods, is sufficient to maintain the contents of the supply container therein. The cross section of the rods can vary and include, without limitation, circular, triangular, square, polygonal, or combinations thereof. Further, any combination of the above-specified rods can be utilized.

In an alternative embodiment, any one or more of the enclosing members can be formed integrally with any one or more of the other enclosing members. For example, the first side member, front member, and second side member might be formed of a rigid sheet bent at an angle at two places to form the aforesaid members. The angles are preferably, without limitation, 90 degrees, relative to a plane defined by the surface of the front member. Each of the two angles can be the same as or different from each other.

In another embodiment, one or more of the surfaces of moving vehicle 14, for example, one or more of the interior surfaces 46–52 of utility box 12 can constitute one or more of the enclosing members comprising vending device 10.

In one embodiment of the present invention, vending device 10 is mounted on any interior surface 46–52 of utility box 12 of moving vehicle 14, including either one of the sidewalls 46, for example adjacent entrance 53 of utility box 12, a backwall 48, a roof 50, a floor 52, or even a rear door, or some combination thereof. A given point on vending device 10 can be located at any height above the floor 52 of moving vehicle 14.

In a preferred embodiment, the interior surface of utility box 12 of moving vehicle 14 on which vending device 10 is mounted comprises a side wall. In a most preferred embodiment, vending device 10 is mounted on a sidewall 46 towards the rear of moving vehicle 14.

Preferably, vending device 10 is mounted so as to minimize intrusion into the most convenient storage area of cargo compartment 30. By "minimize intrusion into the most convenient cargo storage area" is meant that the lowermost portion of vending device 10 minimally interferes with the placement of cargo on the floor of utility box 12 of moving vehicle 14.

In accordance with another aspect of the present invention, there has been provided a vending device 10 affixed within utility box 12 of moving vehicle 14. Vending device 10 further comprises an access-detectable seal which must be disengaged to access vending device 10 such that those wishing to pay for the use of the supplies contained therein can access vending device 10 and wherein such access of vending device 10 can be detected.

Preferably, vending device 10 allows for visual inspection of at least some of the contents of vending device 10.

In an alternative embodiment of the present invention, a vending device can contain multiple compartments. The compartments can be all the same sizes, all different sizes, or some combination thereof. The compartments can be all the same shapes, all different shapes, or some combination thereof.

A plurality of vending devices can be affixed within, for example, utility box 12 of moving vehicle 14. The vending devices can comprise any combination of the embodiments of vending devices as set forth herein.

Figure 22:
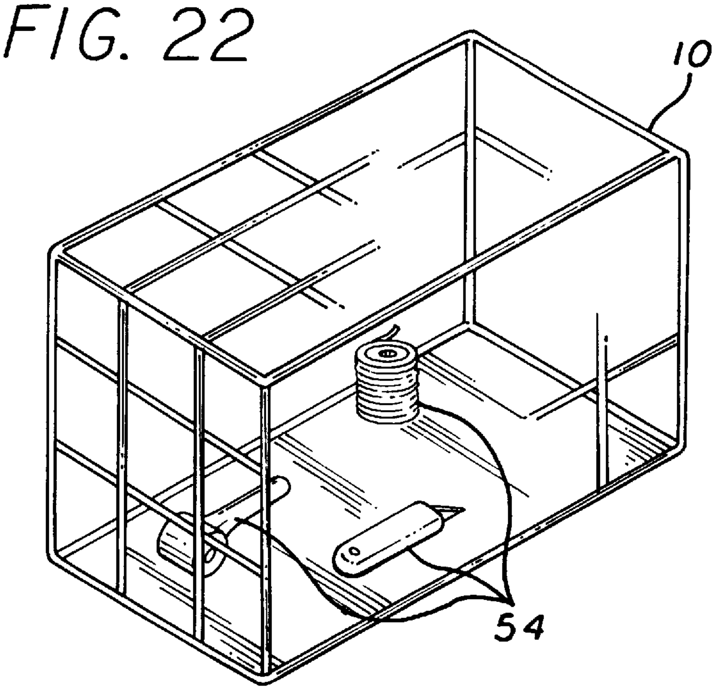
FIG. 22 is a perspective view of an embodiment of a vending device of the present invention including moving supplies stored within the vending device.
Figure 25:
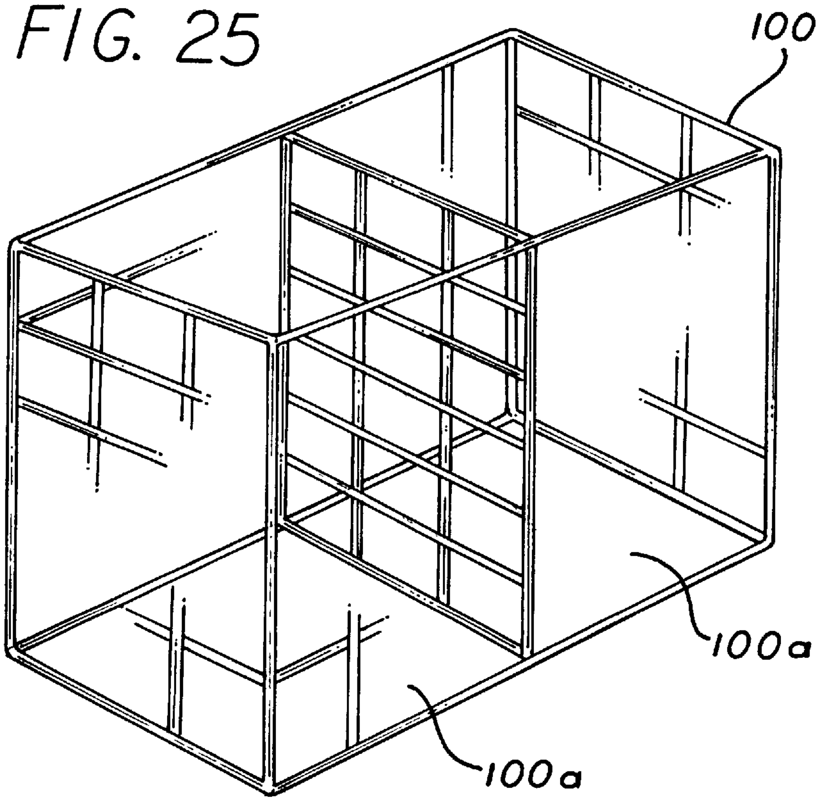

The vending device according to the invention can contain moving supplies 54 available to be dispensed. Such moving supplies can comprise those items a do-it-yourself mover might find useful to assist in moving (see FIG. 22). These include, without limitation, boxes, tape, rope, strapping, packaging materials such as bubble pack or packing "peanuts", wrapping paper, furniture pads, dollies, box cutters, tape dispensers, flashlights, and the like. Moving supplies do not include coins, food, or advertising literature and the like.

Figure 2:
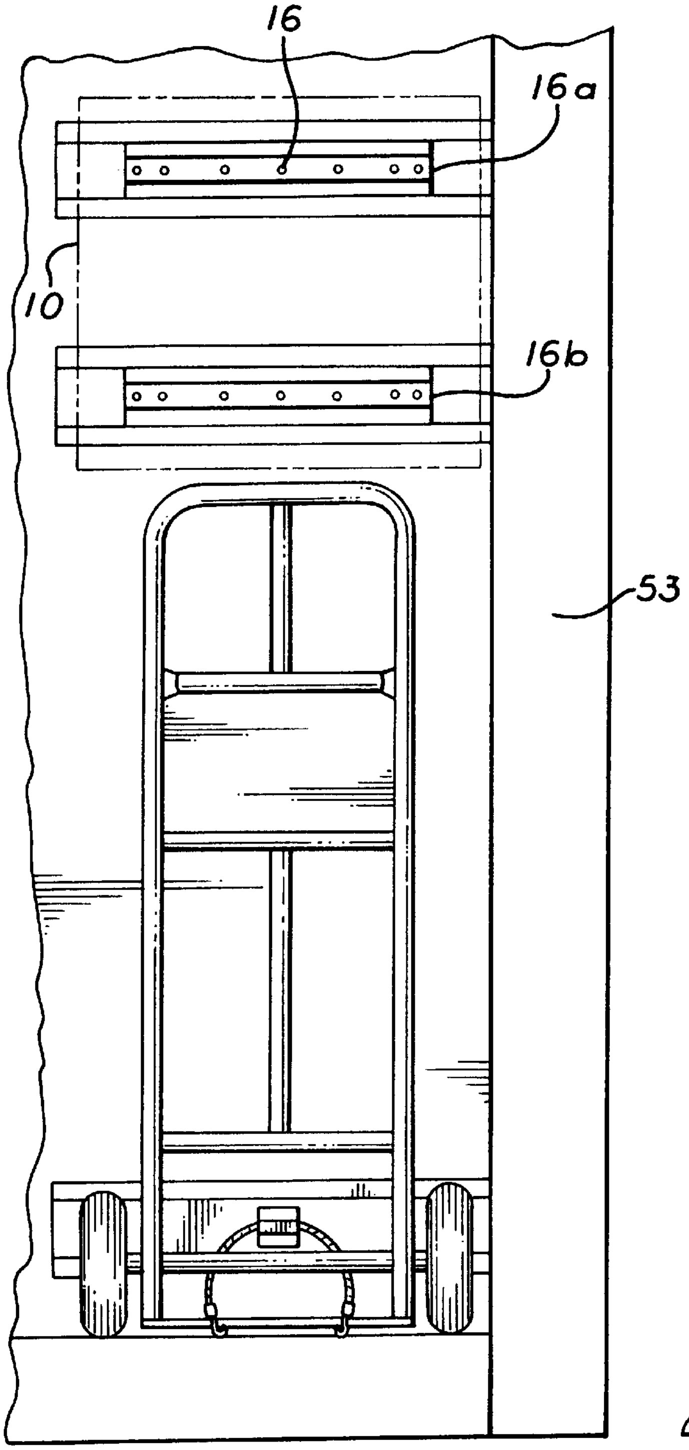
FIG. 2 is a rear view, with the wall of the moving vehicle removed, depicting the rear aspect of a vending system of the present invention.
Figure 3:
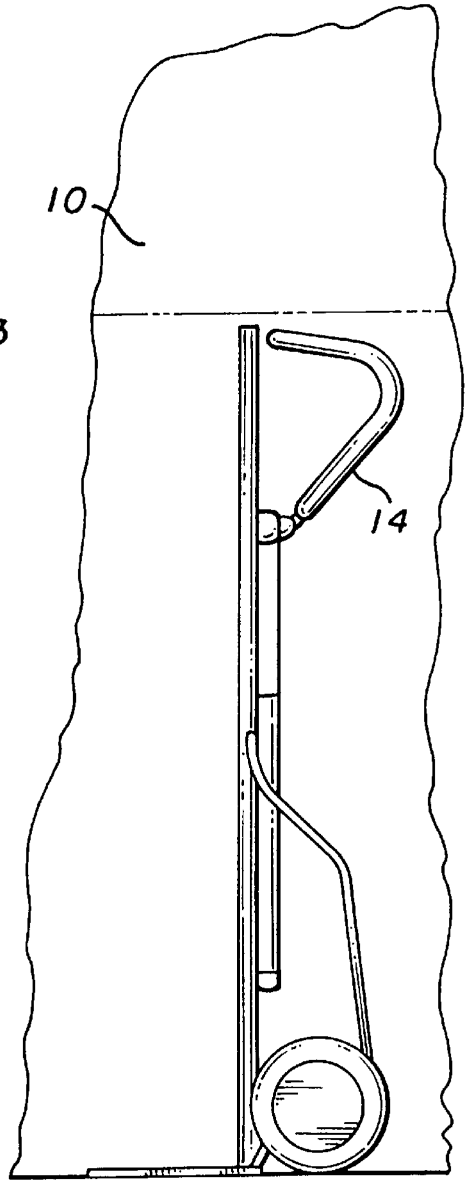
FIG. 3 is a side view of the present invention.

Turning now to FIGS. 2 and 3, affixing means 56 secures mounting brackets 16*a*–*b* of vending device 10 to sidewall 46 of utility box 12. Vending device 10 can be permanently affixed by affixing means 56 to moving vehicle 14. The vending device can alternatively or additionally be permanently affixed at a location including, without limitation, on or in the cab of moving vehicle 14, under utility box 12 of moving vehicle 14, on the roof of utility box 12 of moving vehicle 14, or on the roof of the cab of moving vehicle 14. By "permanently affixed" is meant that removal of vending device 10 from moving vehicle 14 would damage the means affixing vending device 10 to moving vehicle 14, for example, by cutting, breaking or tearing those affixing means. Alternatively, vending device 10 can be removably affixed to moving vehicle 14. Vending device 10 can alternatively or additionally be removably affixed to locations such as those mentioned above. By "removably affixed" is meant that removal of vending device 10 from moving vehicle 14 would not damage the means affixing vending device 10 to moving vehicle 14, for example, by unscrewing, unbolting, or uncoupling the affixing means.

The term "affixed to" one or more of the floor, interior roof, or rear door of utility box 12 of moving vehicle 14 does not restrict the present invention to those vending devices directly affixed to such a surface. By "affixed to" is simply meant that ultimately such a surface substantially prevents movement of the vending device within the utility box. However, for example, padding could be interposed between the vending device and the surface of the utility box without altering the meaning of the term "affixed to". The same definition applies to vending devices affixed to other areas of moving vehicle 14, such as within the cab.

The affixing means can include, without limitation, magnetic, adhesive, or mechanical means, such as screws, bolts, nails, rivets, welds, metallic cables, non-metallic ropes, straps or other means as would be known to one of ordinary skill in the art. The affixing means can engage specific elements on vending device 10, such as brackets 16*a*–*b*. Alternatively or additionally one or more of the enclosing members, for example, rear member 44, can be directly affixed to the moving vehicle. In the case of polarized fixing means, such as those comprised of a male and female component as in a bolt and nut, the male component can protrude from vending device 10 and anchor into a female component affixed to moving vehicle 14 or vice versa.

In another embodiment of the present invention, vending device 10 can be affixed to means for movement so that vending device 10 can easily be moved about the interior of, for example, utility box 12 of moving vehicle 14 on, for example, rails 58, which are affixed to the interior surface of utility box 12 of moving vehicle 14 as depicted in FIG. 1. Once in a desired position, vending device 10 can then be held in place by securing means such as clamps, pins, stops or other devices as would be known to one of ordinary skill in the art.

Turning now to FIGS. 4–7, affixed to a rear member 44 are mounting brackets 16*a–b*, and optionally placard 60. First side member 34 and second side member 36 project from rear member 44. Top member 38 and bottom member 40 project from rear member 44. First side member 34 and second side member 36 can be attached directly to rear member 44. Top member 38 and bottom member 40 can be attached directly to rear member 44. First side member 34, second side member 36, top member 38, and bottom member 40 can all be directly attached to rear member 44. Alternatively, first side member 34 and second side member 36 can be directly attached to rear member 44, and top member 38 and bottom member 40 can be attached to first side member 34 and second side member 36. Alternatively, top member 38 and bottom member 40 can be directly attached to rear member 44, and first side member 34 and second side member 36 can be attached to top member 38 and bottom member 40. Front member 42 with optional placard 62 is attached in hinged engagement to bottom member 40. In other embodiments, front member 42 can be attached in hinged engagement with any one of top member 38, first side member 34, or second side member 36.

Figure 7:
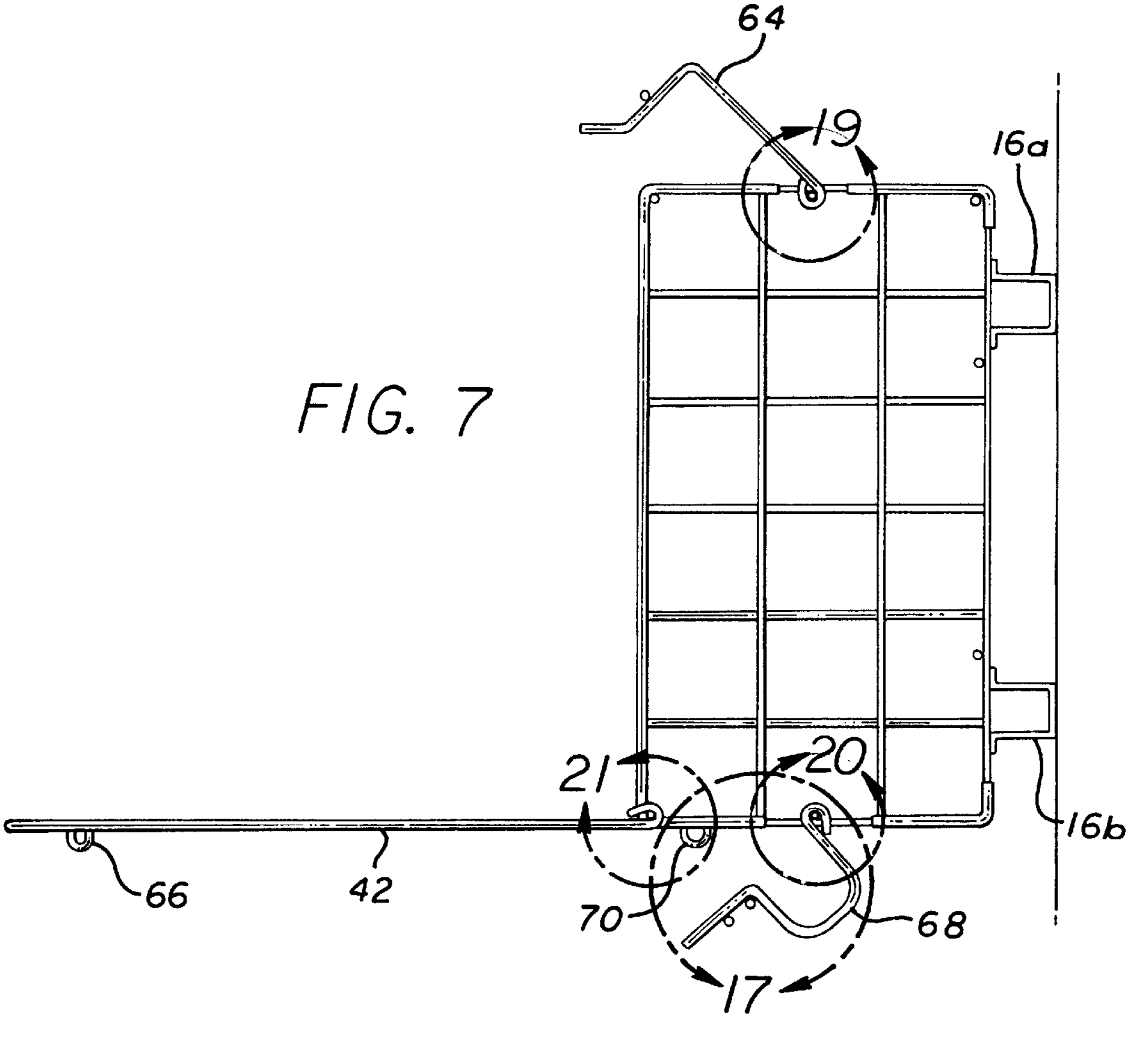
FIG. 7 is a side view of one embodiment of a vending device of the present invention.
Figure 12:
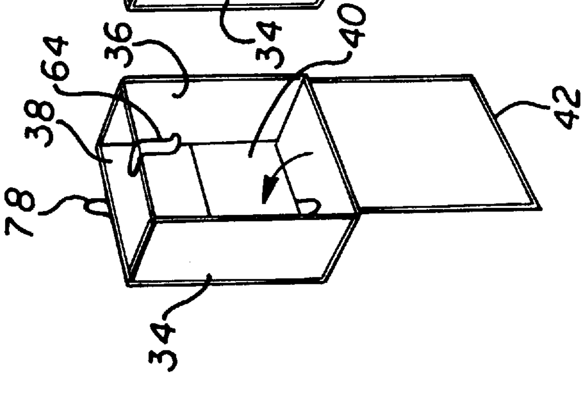
FIGS. 12–16 are perspective outline views of an alternative folding sequence of one embodiment of a vending device of the present invention.
Figure 13:
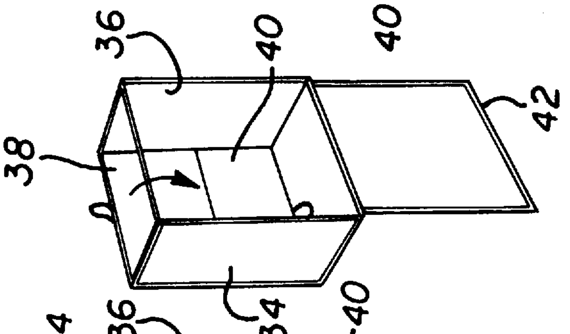
Figure 14:
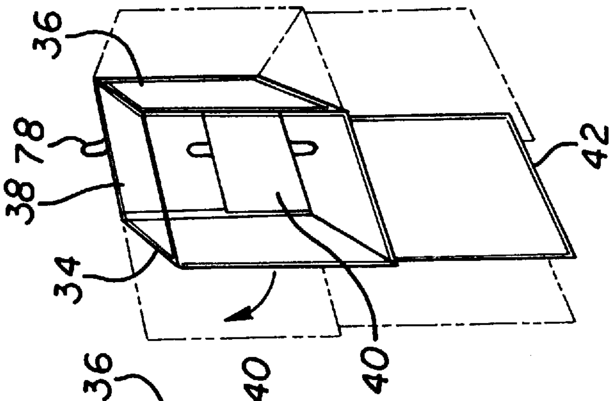
Figure 15:
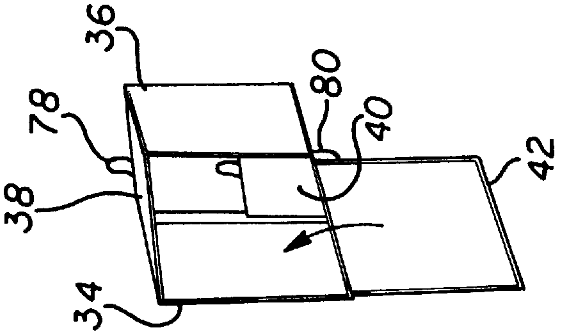
Figure 16:
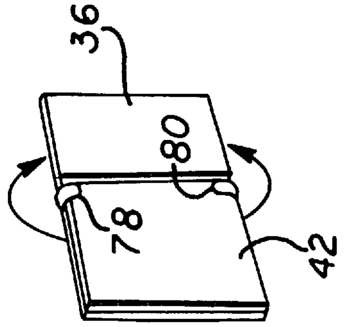
Figure 19:
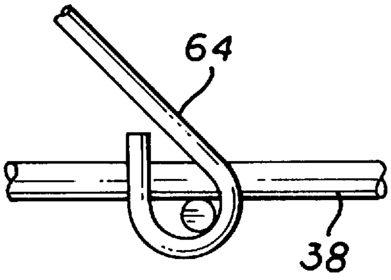
FIG. 19 is an enlarged side view of detail 19 of the hinged engagement of the latching means and the top member of a vending device of FIG. 7.
Figure 21:
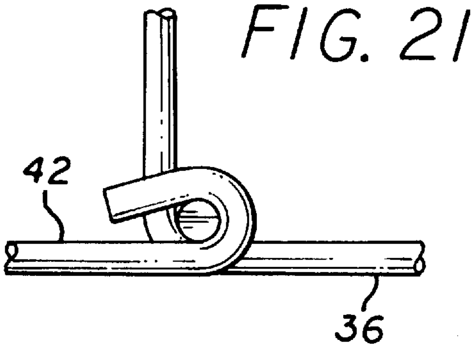
FIG. 21 is a side view of detail 21 of the engagement of two members of a vending device of one embodiment of the present invention shown in FIG. 7.

The hinged engagement of front member 42 with second side member 36, is illustrated in more detail in FIG. 21. Latching means 64 is rotatably attached to top member 38 so that it can engage and disengage front member 42 and hasp 66 as is depicted in FIGS. 7 and 19. The hinged engagement of latching means 64 with top member 38 is illustrated in more detail in FIG. 6. The engagement of top member 38 and front member 42 is illustrated in FIG. 4.

In one embodiment of the present invention vending device 10 can be reversibly reducible in size, such that the volume of space enclosed by vending device 10 can be reduced. In such an embodiment, the term "collapsible vending device" can be used synonymously. In one particular embodiment, such reduction in the volume of space enclosed by the collapsible vending device is accomplished through the use of a number of separate enclosing members of the collapsible vending device in moveable engagement with each other. In a specific embodiment, the plurality of separate enclosing members of the collapsible vending device are in hinged engagement with each other, whereby at least some of the separate enclosing members of the collapsible vending device can be rotated about one, but only one, of two axes. Such hinged engagement may be provided by, for example, and without limitation, hinges which are formed integrally between at least two of the plurality of separate enclosing members, as depicted in detail in FIG. 21 or separate hinges may be used and affixed to at least two of the plurality of separate enclosing members. Axes about which at least some of the separate enclosing members of the collapsible vending device can be rotated are illustrated in FIG. 8. The axes form an angle relative to each other, including a perpendicular angle. The axes are substantially parallel to an interior surface area of moving vehicle 14, such as utility box 12. This rotation of one or more of the enclosing members of the collapsible vending device results in the closer proximity of such members to an interior surface area of, for example, utility box 12 of moving vehicle 14. For example, the rotation of bottom member 40, depicted in FIG. 8, results in the closer proximity of the surface of bottom member 40 to the surface of utility box 12.

In a particular embodiment, such rotation of at least one of the enclosing members comprising the collapsible vending device can be directed inwardly with respect to a point on back member 44. FIGS. 8–11 illustrate how the side members 34 and 36, the top member 38, the bottom member 40, and the front member 42 are sequentially folded inwardly with respect to back member 44.

In yet another embodiment, rotation of at least one of the enclosing members comprising the collapsible vending device can be directed outwardly with respect to a point on back member 44. Thus in FIG. 14, left side member 34 is folded outwardly with respect to a point on back member 44. In another embodiment, the reversible reduction in the volume of space enclosed by the collapsible vending device can be accomplished through displacement means, which provide for moveable engagement of a number of separate enclosing members comprising the collapsible vending device, whereby at least some enclosing members of the collapsible vending device are displaceable towards a surface of the utility box of the moving vehicle along a line extending from the plane of the surface of the utility box of the moving vehicle.

In a specific embodiment, the displacement means which provides for the reversible reduction in the volume of space enclosed by the collapsible vending device comprise compressible members which allow for a compression of at least one of the separate enclosing members along an axis which lies substantially perpendicular to a plane substantially parallel to the interior surface of the utility box. Such displacement means can comprise an arrangement of struts capable of accordion-like contraction and expansion.

In another preferred embodiment, the collapsible vending device includes at least one clasp for releasably securing the vending device in a collapsed or flattened state. Such an embodiment is illustrated in FIGS. 12–16 , in which clasps 78, 80 rotatably affixed to back member 44, rotate to a closed state and contact front member 42 thereby securing the vending device in a flattened state.

Figure 5:
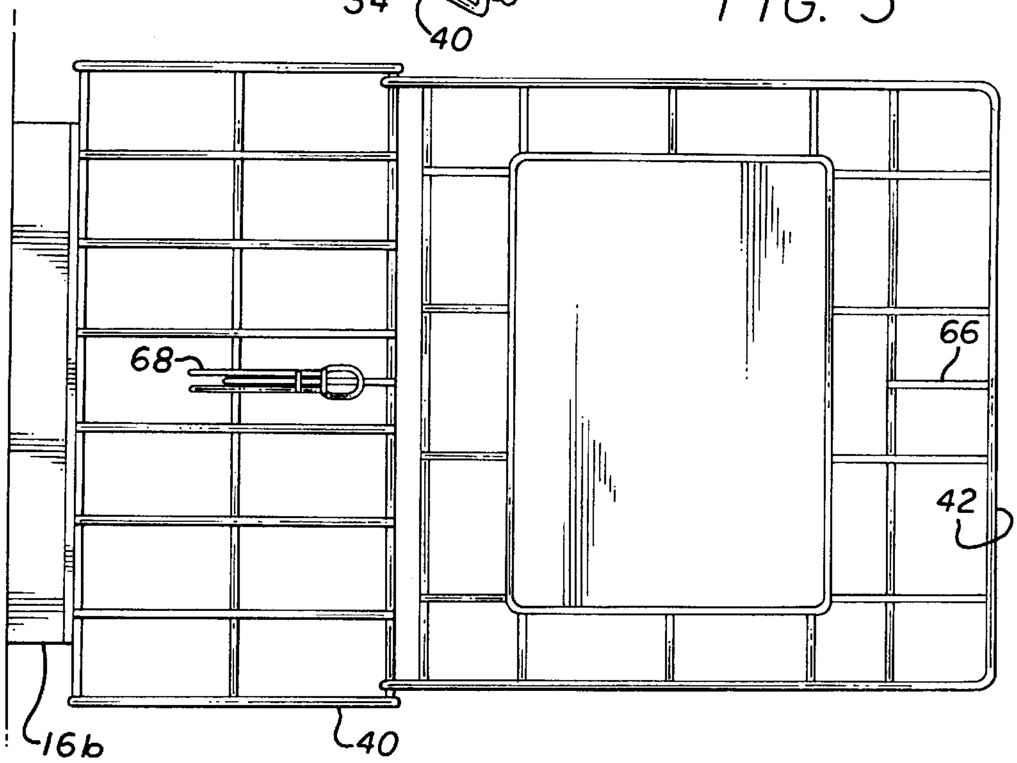
FIG. 5 is a bottom plan view of one embodiment of a vending device of the present invention.
Figure 6:
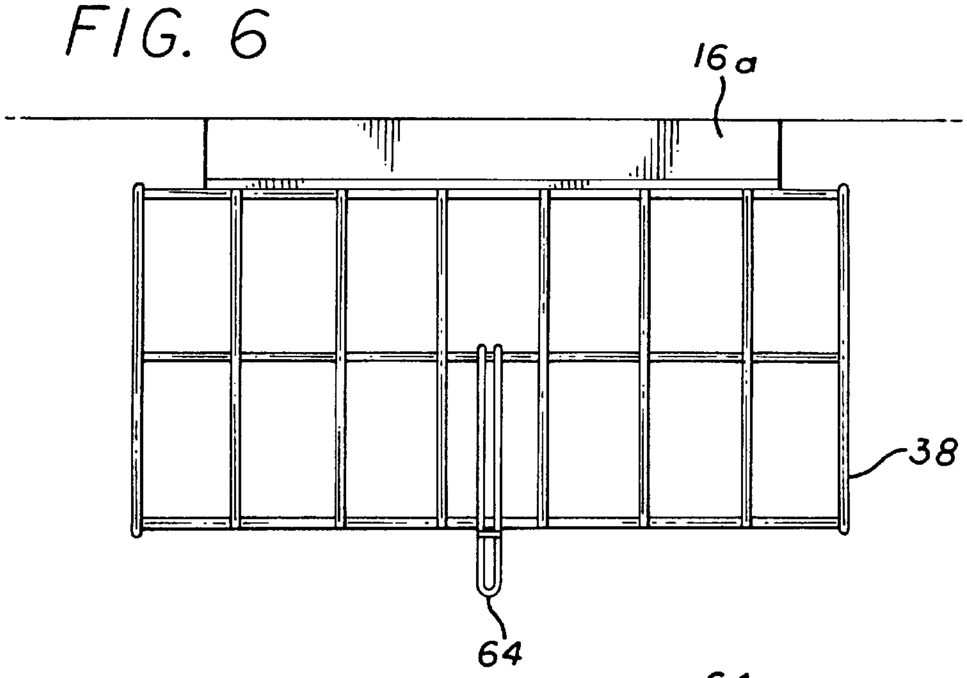
FIG. 6 is a top plan view of one embodiment of a vending device of the present invention.
Figure 20:
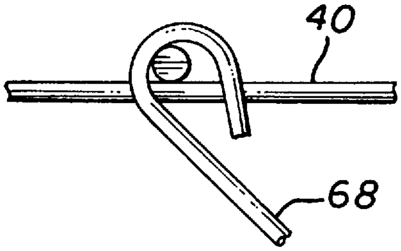
FIG. 20 is an enlarged side view of detail 20 of FIG. 7, showing the hinged engagement of the dolly engaging latch and the bottom member of a vending device of one embodiment of the present invention.

Moving dolly engaging latch 68 is rotatably attached to bottom member 40 in FIG. 5. The hinged engagement of moving dolly engaging latch 68 with bottom member 40 is illustrated in more detail in FIG. 20.

Figure 23:
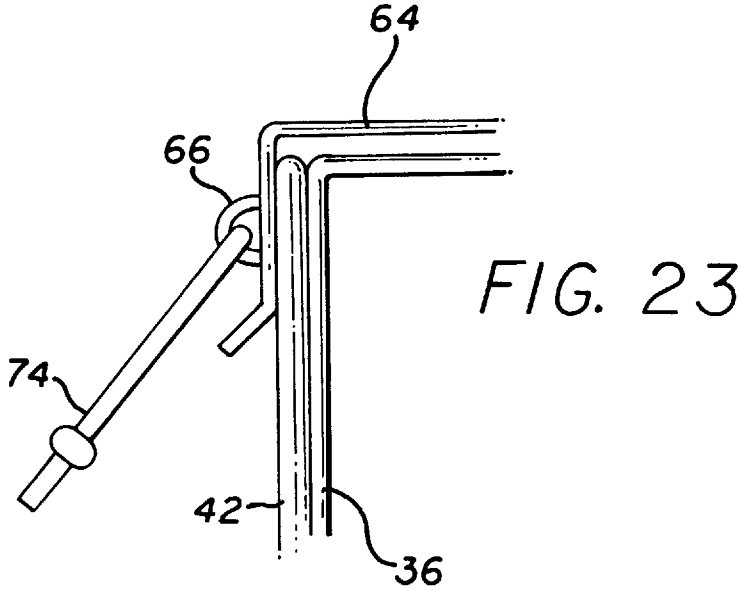
FIG. 23 is a side view of an access detectable seal used in connection with a vending device of the present invention.

A portion of latching means 64which engages an access-detectable seal to vending device 10 is shown in FIG. 23.

Figure 17:
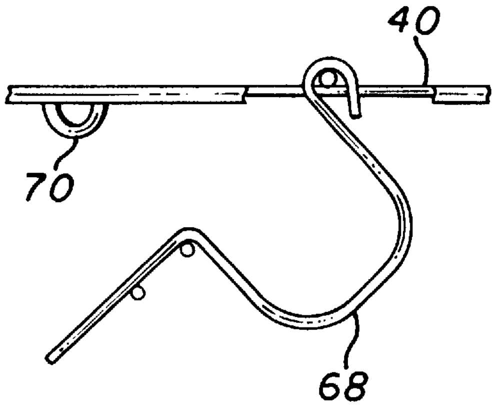
FIG. 17 is a side view of detail 17 of a moving implement securing latch of the vending device of FIG. 7 in an open position.
Figure 18:
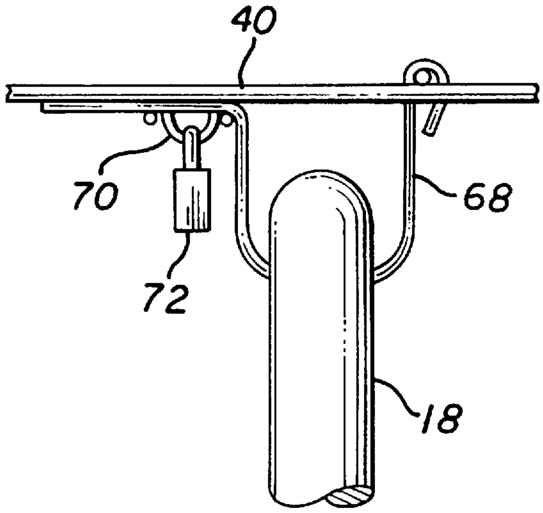
FIG. 18 is a side view in greater detail of a moving implement securing latch of a vending device of the present invention in a closed position.
Figure 24:
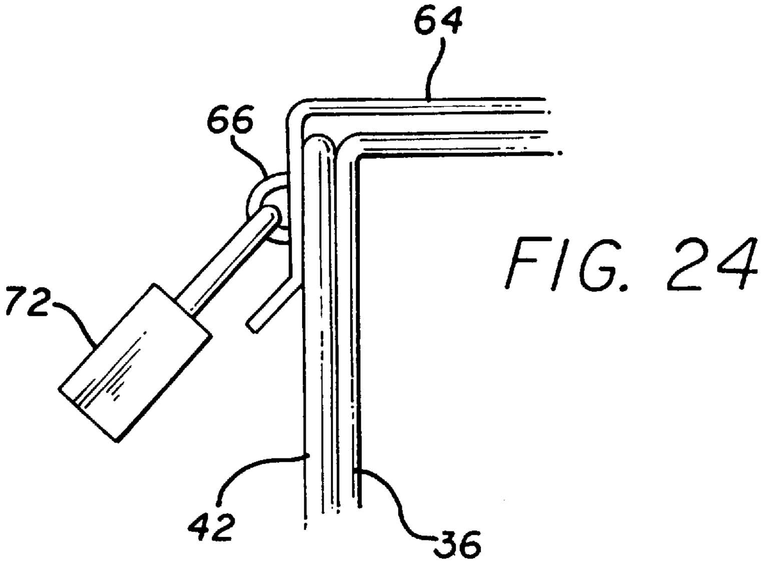
FIG. 24 is a side view of an access controllable seal used in connection with a vending device of the present invention.

Front member 42 is shown in a downwardly open position in FIG. 7. Further, front member 42 has attached thereto hasp 66 which engages with latching means 64, which with the addition of an access-controllable seal to vending device 10, such as a padlock 72 (see FIG. 24), or access-detectable seal, such as a sealed band 74 (see FIG. 23), provides for controlled access to vending device 10. Also shown (see FIGS. 17 and 20) is a moving implement engaging latch 68 affixed to bottom member 40 along with hasp 70 which provides for placement of an access-detectable seal or an access controllable-seal to control access to a moving implement, such as a moving dolly. FIG. 17 illustrates in greater detail a side perspective view of moving dolly engaging latch 68 and hasp 70. FIG. 18 illustrates, in a side perspective view, the handle of moving dolly 18 restrictively contained within moving dolly engaging latch 68, which has engaged hasp 70 and padlock 72 secured through hasp 70.

In a particular embodiment, in which vending device 10 includes a moving implement engaging latch 68 for affixing an implement useful in moving, such as dolly 18, access to dolly 18 can be controlled concurrently with or independently of access to vending device 10.

In a preferred embodiment, the latch is a moving dolly engaging latch 68 which can be rotatably engaged about hasp 70, thereby enclosing the handle of moving dolly 18. Hasp 70 can then be engaged by an access-controllable seal such as a lock 72, or an access-detectable seal such as a sealed band.

An "access-detectable seal" can comprise any material which can be affixed to an access member of vending device 10, such that normal use of the access member such as rotating a front member 42 of vending device 10 to a downwardly open position will sever or deform the seal to the extent that such access is detectable. Thereby, access to the interior of vending device 10 can be detected. The access-detectable seal can merely contact two points on vending device 10 such that sufficient displacement of one point relative to another stretches or breaks the seal. Alternatively, the access-detectable seal can continuously surround at least two points located on the vending device such that sufficient displacement of one point relative to another stretches or breaks the seal. In a preferred embodiment one point is located on an access member and another point is located on an nonaccess member of vending device 10. The access-detectable seal is not limited to a particular shape. The access-detectable seal can be relatively rigid or flexible. In preferred embodiments human hands, scissors, pliers, wire cutters, and the like can be used to sever or deform the access-detectable seal.

The access-detectable seal can comprise a sealed band affixed to vending device 10, whereby access to the vending device requires severing or deforming the sealed band. The sealed band can be formed of materials, including without limitation, metal, plastic, paper, leather, rubber, wood, wax, or combinations thereof. The sealed band is preferably formed such that its severance or deformation is readily noticeable and not easily reversible. In one embodiment, substitution of the sealed band can be made difficult by use of specially printed, embossed, or otherwise identifiable materials not readily available to a user of the vending device.

In another embodiment there is provided an access-controllable seal. An "access-controllable seal", such as lock 72, is a device which restricts access to the interior of vending device 10. The access-controllable seal is typically, but not necessarily, reusable. The access-controllable seal is designed to prevent access to the interior of vending device 10 without the use of a specially designed implement which allows such access. Access to vending device 10, sealed by access-controllable controllable seals, is not designed to occur through use of ordinary tools, such as human hands, scissors, pliers, and the like. The access-controllable seal can comprise a locking means requiring use of an unlocking means to allow access to vending device 10. For example, the locking means can comprise a key lock and the unlocking means can comprise a key. The locking means can comprise a combination lock and the unlocking means can comprise a combination to the combination lock.

Alternatively, the locking means can comprise a locking mechanism and the unlocking means can comprise United States coin(s) and/or currency. In another embodiment, the locking means can comprise a locking mechanism and the unlocking means can comprise a token. In yet another embodiment the locking means can comprise a locking mechanism and the unlocking means can comprise a magnetic strip card key.

A method for providing supplies to the users of a moving vehicle and of controlling the accessing of such supplies includes the step of providing supplies within a vending device as described herein, the vending device being affixed adjacent the moving vehicle. The supplies are secured within the vending device with an access-controlling means. The moving vehicle is provided to a user, and access to the vending device is detected.

The vending device can be accessed in a number of ways, including providing payment to a means for accepting payment which can be located adjacent moving vehicle 14, providing payment to a means for accepting payment which can be affixed adjacent utility box 12 of moving vehicle 14, providing payment to a means for accepting payment which can be located remotely from moving vehicle 14, and providing payment after supplies provided in vending device 10 have been utilized.

The method for gaining access to vending device 10 can alternatively require prior presentation of payment in order to access vending device 10. The prior payment can be made to an individual employed by, for example, a moving truck, trailer, and supply rental company, whereupon an individual employed by the rental company will provide access to vending device 10.

In one aspect of the present invention the vending system provides materials to users of the moving vehicle without additional fees charged for the use of such materials. Accordingly, vending devices in this aspect of the present invention can omit means of controlling access thereto or detecting access thereto.

In another aspect of the present invention the vending system provides materials to users with additional fees charged for the use of such materials. Accordingly, vending devices in this aspect of the present invention have additional means for controlling access to supplies or allowing for detection of access of such supplies, such as an access-detectable means, as defined.

In another embodiment the vending devices described herein can function as auxiliary cargo holders rather than supply repositories, in which instance additional payment might be charged for addition of items to the vending device rather than use of items contained therein.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A moving system comprising (a) a moving vehicle, (b) a vending device affixed to said moving vehicle, said vending device defining an enclosed volume, said vending device including a sealing device affixed to said vending device for sealing said enclosed volume, and (c) moving supplies disposed within said enclosed volume of said vending device and available to be dispensed.

2. The moving system of claim 1 wherein said vending device is comprised of a plurality of separate enclosing members.

3. The moving system of claim 2 wherein said plurality of separate enclosing members comprise a first side member, a second side member, a top member, a bottom member, a back member, and a front member, said enclosing members defining said enclosed volume.

4. The moving system of claim 3 wherein said vending device is collapsible to a flattened state by sequentially rotating said bottom member into contact with said back member, rotating said top member into contact with said bottom member, rotating said first and second side members into contact with said top member, and rotating said front member to a position adjacent said first side member and in contact with said second side member.

5. The moving system of claim 4 further comprising a latch affixed to said top member which is rotatable to a retention position in which said latch engages said front member, wherein said sealing device seals said latch in said retention position.

6. The moving system of claim 4 further comprising a latch rotatably affixed to said bottom member and a second sealing device for securing said latch to said bottom member.

7. The moving system of claim 3 wherein said vending device is collapsible to a flattened state.

8. The moving system of claim 7 further comprising means for securing said vending device in said flattened state.

9. The moving system of claim 8 wherein said means for securing said vending device comprise at least one clasp for releasably securing said front member to said second side member.

10. The moving system of claim 9 wherein said clasp is affixed to said back member and rotates to a closed state in which said clasp contacts said front member in said flattened state.

11. The moving system of claim 9 comprising two of said clasps.

12. The moving system of claim 2 wherein said separate enclosing members are rigid.

13. The moving system of claim 1 wherein said vending device comprises a plurality of separate enclosing members in movable engagement.

14. The moving system of claim 13 wherein said vending device further comprises at least one hinge for effecting said movable engagement of said plurality of separate enclosing members.

15. The moving system of claim 13 wherein said members collapsibly define said enclosed volume.

16. The moving system of claim 1 comprising a plurality of said vending devices affixed to said moving vehicle.

17. The moving system of claim 1 wherein said sealing device is an access-detectable seal.

18. The moving system of claim 17 wherein said access-detectable seal comprises a sealed band affixed to said vending device.

19. The moving system of claim 1 wherein said sealing device is an access-controllable seal.

20. The moving system of claim 19 wherein said access-controllable seal is a lock.

21. The moving system of claim 1 further comprising a moving implement engaging latch for securing an implement useful in moving.

22. The moving system of claim 21 further comprising a moving dolly secured by said moving implement engaging latch.

23. The moving system of claim 21 further comprising a second sealing device for controlling access to said moving implement.

24. The moving system of claim 1 wherein said moving vehicle further comprises means for moving said vending device, said means being affixed to said moving vehicle.

* * * * *